US011644347B2

(12) United States Patent
Okamoto et al.

(10) Patent No.: US 11,644,347 B2
(45) Date of Patent: May 9, 2023

(54) MANHOLE POSITION SPECIFICATION METHOD AND MANHOLE POSITION SPECIFICATION SYSTEM

(71) Applicant: Nippon Telegraph and Telephone Corporation, Tokyo (JP)

(72) Inventors: Tatsuya Okamoto, Musashino (JP); Daisuke Iida, Musashino (JP); Hiroyuki Oshida, Musashino (JP); Tetsuya Manabe, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 71 days.

(21) Appl. No.: 17/275,327

(22) PCT Filed: Sep. 12, 2019

(86) PCT No.: PCT/JP2019/035986
§ 371 (c)(1),
(2) Date: Mar. 11, 2021

(87) PCT Pub. No.: WO2020/059640
PCT Pub. Date: Mar. 26, 2020

(65) Prior Publication Data
US 2021/0255005 A1 Aug. 19, 2021

(30) Foreign Application Priority Data

Sep. 20, 2018 (JP) .............................. JP2018-176419
Mar. 26, 2019 (JP) .............................. JP2019-058575

(51) Int. Cl.
G01D 5/353 (2006.01)
E02D 29/14 (2006.01)
G01H 9/00 (2006.01)

(52) U.S. Cl.
CPC ......... *G01D 5/35306* (2013.01); *E02D 29/14* (2013.01); *G01D 5/35358* (2013.01); *G01H 9/004* (2013.01)

(58) Field of Classification Search
CPC ............ G01D 5/35306; G01D 5/35358; E02D 29/14; G01H 9/004
See application file for complete search history.

(56) References Cited

U.S. PATENT DOCUMENTS

2008/0088846 A1* 4/2008 Hayward ........... G01M 11/3109
73/649
2019/0197846 A1* 6/2019 Englund ................ G01H 9/004
2021/0140122 A1* 5/2021 Wilczek ................ B61L 25/025

FOREIGN PATENT DOCUMENTS

WO    2018045433 A1    3/2018

OTHER PUBLICATIONS

Griffiths, Barry. "Developments in and applications of fibre optic intrusion detection sensors." Proceedings The Institute of Electrical and Electronics Engineers. 29th Annual 1995 International Carnahan Conference on Security Technology. IEEE, 1995. (Year: 1995 ).*

(Continued)

*Primary Examiner* — Dominic J Bologna
(74) *Attorney, Agent, or Firm* — Workman Nydegger

(57) ABSTRACT

A manhole position identification method of the present invention includes: measuring, from an end of an optical fiber, a temporal variation in scattering light from the optical fiber when an impact blow is applied to a cover of a manhole located on a path of the optical fiber, so as to obtain temporal variations in a scattering light intensity distribution in a longitudinal direction of the optical fiber; determining an occurrence of vibration due to the impact blow based on the temporal variations at positions in the scattering light intensity distribution, so as to identify an impact blow position on the optical fiber; and associating the impact blow position on (Continued)

the optical fiber with a map position of the manhole whose cover has received the impact blow, so as to identify a position of the manhole expressed in terms of optical fiber length from the end.

5 Claims, 8 Drawing Sheets

(56) References Cited

OTHER PUBLICATIONS

Griffiths Barry, "Developments In and Applications of Fibre Optic Intrusion Detection Sensors", Proceedings The Institute of Electrical Engineers and Electronics Engineers 29th Annual 1995 International Carnahan Conference on Security Technology, Oct. 18-20, 1995, pp. 325-330.

Yuelan Lu et al., *Distributed Vibration Sensor Based on Coherent Detection of Phase-OTDR*, IEEE Journal of Lightwave Technology, Nov. 2010, vol. 28, No. 22, pp. 3243-3249.

*Water Immersion Detection Module* [online], [searched on Sep. 3, 2018], the Internet <URL:http://www.opcom.co.jp/product/hikarisystem/passive/shinsui-module/, pp. 2.

Paul R. Hoffman et al., *Position Determination of an Acoustic Burst Along a Sagnac Interferometer*, Journal of Lightwave Technology, Feb. 2004, vol. 22, No. 2, p. 494-498.

\* cited by examiner

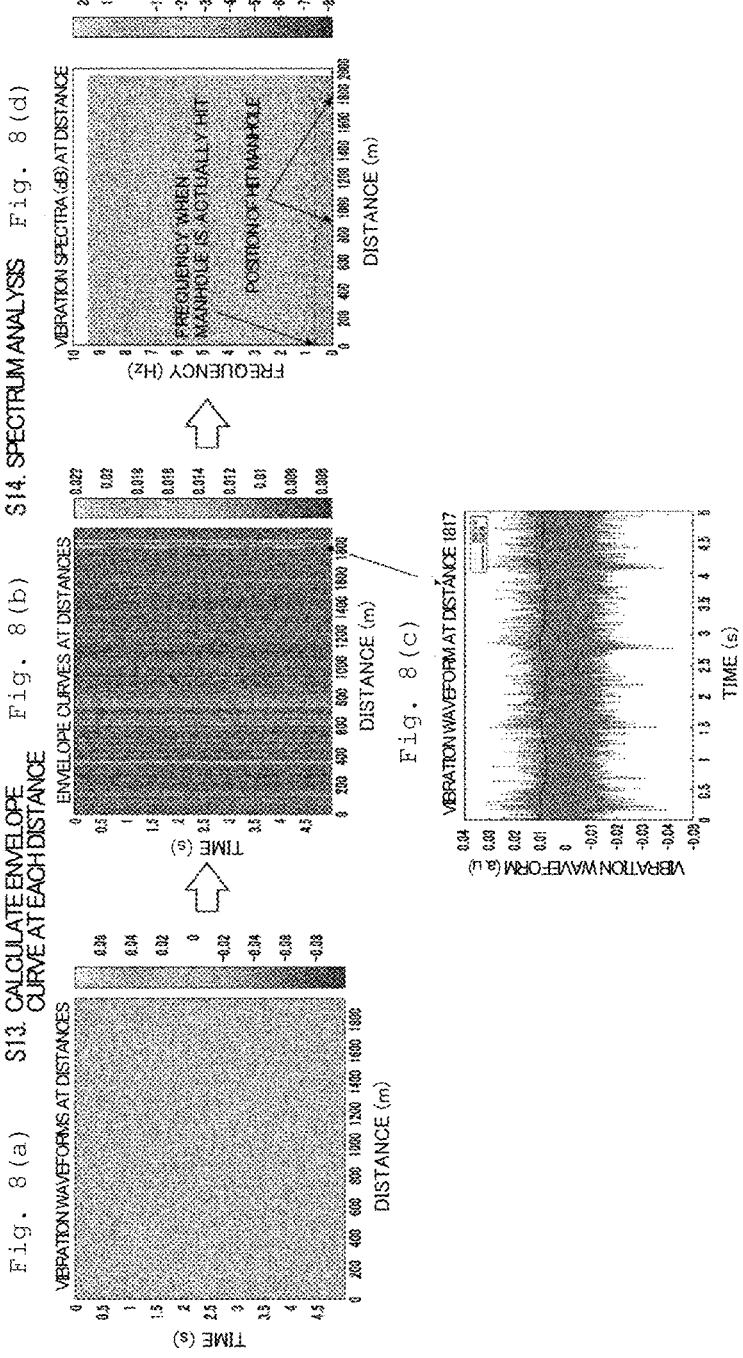

MANHOLE POSITION SPECIFICATION METHOD AND MANHOLE POSITION SPECIFICATION SYSTEM

TECHNICAL FIELD

The present invention relates to a technique for identifying the position of a manhole to which an optical fiber communication line is connected, by expressing it in terms of optical fiber length from an intensive communication building.

BACKGROUND ART

Conventionally, if an operation is required in a manhole in which an optical fiber communication line is accommodated, an operator will identify the manhole in which the operation is to be performed with reference to a map and the name of the manhole. If the purpose of the operation is described on the basis of a managed manhole name, that is, if the purpose is associated with a manhole name, such as "to perform a cable connection operation in a manhole named XX located at the XX intersection", the position of the manhole in which the operation is to be performed can be identified based on a map and a database. Also, if, for example, a water immersion detection module (Non Patent Literature 2) that detect whether or not an optical closure storing an optical fiber is submerged is remotely monitored using a remote optical test based on Optical Time Domain Reflectometry (OTDR), or if a test for optical loss on an optical fiber line is conducted, the position of the manhole is identified based on the distance of the optical fiber on an optical fiber communication path that is obtained by the OTDR. For example, if it is detected by the OTDR that some manhole is flooded and the optical closure is submerged, the position of the manhole will be determined based on the distance from the communication building. At this time, the manhole in which the operation is to be performed is identified with reference to a database that contains paths and manhole positions.

As a technique for remotely measuring the state of an optical fiber, provided is a vibration sensor to which the above-described OTDR is applied (Non Patent Literature 1). This vibration sensor is a distributed sensor that detects, when the optical fiber is moved, a temporal variation in which the length of the optical fiber is slightly varied, and thereby can measure the vibration of the optical fiber and the position expressed in terms of fiber length. Also, examples of the distributed sensor that detects vibration based on a slight variation in the length of the optical fiber include, in addition to the OTDR-based sensor, a sensor using interferometer (Non Patent Literature 3).

PRIOR ART

Non Patent Literatures

[NPL 1]: Y. Lu, et al, "Distributed vibration sensor based on coherent detection of phase-OTDR," IEEE Journal of Lightwave Technology, November 2010, vol. 28, No. 22, p.3243-p.3249
[NPL 2]: "water immersion detection module" [online], [searched on Sep. 3, 2018], the Internet <URL:http://www.opcom.co.jp/product/hikarisystem/passive/shinsui-module/
[NPL 3]: P. R. Hoffman, et al, "Position determination of an acoustic burst along a Sagnac Interferometer," Journal of Lightwave Technology, February 2004, vol. 22, No. 2, p.494-p.498

SUMMARY OF THE INVENTION

Technical Problem

In a remote test, the position of the manhole is identified only based on the distance thereof on a tested optical fiber. There is no problem in identifying the manhole in which an operation is to be performed based on the optical fiber length, if a database includes all manhole positions on the path expressed in terms of optical fiber lengths. However, an optical fiber length largely differs from the map distance due to the extra length in connection portions and the like, and is changed as needed when a branch, a connection, and the like of cables are added to the path. Accordingly, an optical fiber length serving as an index indicating the position of a manhole is not a reliable index. Therefore, even if the position at which an operation is to be performed is identified based on the optical fiber length by a remote test, there is no other choice, due to the name of the manhole being unknown, to stop the traffic on the road on site, and open the cover to check whether this is the manhole in which the operation is to be performed such as a submerged manhole, taking significant time and energy. Also, even if such significant efforts are made to open the cover and perform the checking, there is still a high likelihood that this is not the manhole in which the operation is to be performed, and the operator needs to repeat such an operation with significant efforts a number of times.

Also, in the vibration position identification technique using optical fiber vibration sensing and vibration actuation, there is sometimes a case where it is difficult to identify a vibration position, due to a low signal-to-noise ratio (SNR) of a measurement result.

In view of the above-described problems of the conventional techniques, an object of the present invention is to enable, by associating a manhole position with an optical fiber length without opening the cover, identification of the position of a manhole in which an operation is to be performed, clarification of a map route based on the identification of the manhole position in the optical fiber length, and management of manhole positions expressed in terms of optical fiber lengths on a database.

Another object is to facilitate, in the vibration position identification technique using optical fiber vibration sensing and vibration actuation, identification of a vibration position by performing signal processing on a measurement result.

Means for Solving the Problem

In order to achieve such objects, a manhole position identification method according to a first aspect of the present invention includes: a first step of measuring, from an end of an optical fiber, a temporal variation in scattering light from the optical fiber when an impact blow is applied to a cover of a manhole located on a path of the optical fiber, so as to obtain temporal variations in a scattering light intensity distribution in a longitudinal direction of the optical fiber; a second step of determining an occurrence of vibration due to the impact blow based on the temporal variations at positions in the scattering light intensity distribution, so as to identify an impact blow position on the optical fiber; and a third step of associating the impact blow position on the optical fiber with a map position of the manhole whose cover has received the impact blow, so as to identify a position of the manhole expressed in terms of optical fiber length from the end.

The manhole position identification method according to a second aspect relates to the first aspect, wherein in the first step, predetermined vibration due to a designated frequency, temporal timing, or pulsation is applied as the impact blow to the cover, and in the second step, the vibration due to the impact blow is detected by performing filtering processing for extracting a component of the predetermined vibration on a temporal variation signal at each of the positions in the scattering light intensity distribution.

The manhole position identification method according to a third aspect relates to the second aspect, wherein in the first step, predetermined vibration due to a designated frequency is applied as the impact blow to the cover, and in the second step, the vibration due to the impact blow is detected by calculating a spectrum of an envelope curve with respect to a temporal variation signal at each of the positions in the scattering light intensity distribution, and performing filtering processing for extracting a peak of the designated frequency on the spectrum.

The manhole position identification method according to a fourth aspect relates to any one of the first to third aspects, wherein in the first step, applying the impact blow and measuring the temporal variations in the scattering light are synchronized with each other using a communication interface.

The manhole position identification method according to a fifth aspect relates to any one of the first to fourth aspects, wherein in the first step, for the measurement of the temporal variations in the scattering light, optical time domain reflectometry is used that measures back scattering light generated by an incident light pulse, and the frequency of the impact blow is set to a frequency having a period that is longer than a time period in which the light pulse makes a round trip through the optical fiber.

The manhole position identification method according to a sixth aspect relates to any one of the first to fourth aspects, wherein the first step employs a method in which an optical interferometer is used to measure, from two ends of the optical fiber, a temporal variation in the scattering light.

A manhole position identification system according to a seventh aspect relates to a manhole position identification system to be connected to an end of an optical fiber, and configured to identify the position of a manhole located on a path of the optical fiber, including: an optical meter configured to measure, from the end, temporal variations in scattering light from the optical fiber when an impact blow is applied to a cover of the manhole, so as to obtain temporal variations in a scattering light intensity distribution in a longitudinal direction of the optical fiber; and a signal processing unit configured to determine an occurrence of vibration due to the impact blow based on the temporal variations at positions in the scattering light intensity distribution, so as to identify an impact blow position on the optical fiber, and to associate the impact blow position on the optical fiber with a map position of the manhole whose cover has received the impact blow, so as to identify a position of the manhole expressed in terms of optical fiber length from the end.

The manhole position identification system an eight aspect relates to the seventh aspect, further including a vibration mechanism configured to apply predetermined vibration due to a designated frequency, temporal timing, or pulsation, as the impact blow, to the cover, wherein the signal processing unit detects the vibration due to the impact blow by performing filtering processing for extracting a component of the predetermined vibration on a temporal variation signal at each of the positions in the scattering light intensity distribution.

The manhole position identification system according to a ninth aspect relates to the eighth aspect, wherein the vibration mechanism applies predetermined vibration due to a designated frequency as the impact blow to the cover, and the signal processing unit detects the vibration due to the impact blow by calculating a spectrum of an envelope curve with respect to a temporal variation signal at each of the positions in the scattering light intensity distribution, and performing filtering processing for extracting a peak of the designated frequency on the spectrum.

Effects of the Invention

With the use of the technique of the present invention, by an operator applying an impact blow to the cover of a manhole on site without opening the manhole, it is possible to associate the optical fiber length of the position of the manhole expressed in terms of optical fiber length measured by a remote test or the like, with a map position thereof. This can contribute to identifying the position of an operation target manhole when an optical fiber line is established, compiling a database of positional data expressed in terms of optical fiber length, and setting a route for use in maintenance, for example.

In the vibration position identification technique using optical fiber vibration sensing and vibration actuation, even if the signal-to-noise ratio (SNR) of a measure signal is significantly low, it is possible to easily detect vibration caused by an impact blow.

BRIEF DESCRIPTION OF DRAWINGS

FIG. 8 illustrate an example of the vibration position identification method according to Embodiment 3 of the present invention.

Hereinafter, embodiments of the manhole position identification system and the manhole position identification method of the present invention will be described in detail with reference to the drawings. Note, however, that the present invention is not limited to the description of the embodiments below, and it is obvious for a person skilled in the art that the embodiments and details thereof may be modified in a various manner without departing from the spirit of the invention disclosed in the present specification and the like. Note that, in the configuration of the invention described below, the same reference signs are given to the same components or components having similar functions, and the redundant description may be omitted.

DESCRIPTION OF EMBODIMENTS

Embodiment 1

Figure 1:
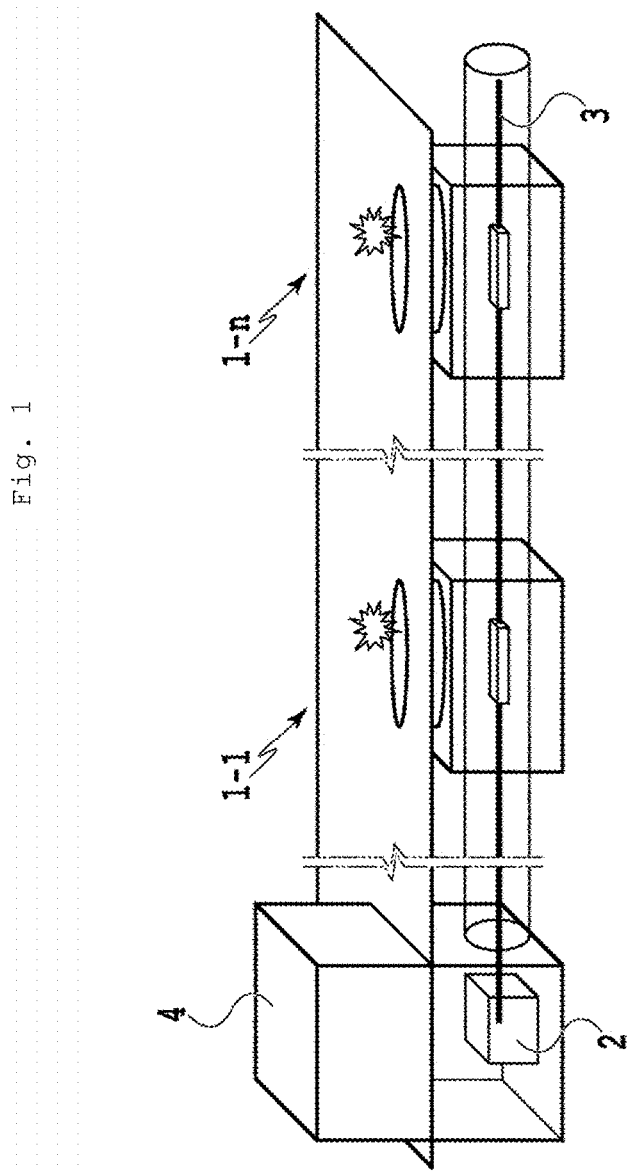
FIG. 1 is a diagram illustrating a configuration of a system according to Embodiment 1 of the present invention.
Figure 2:
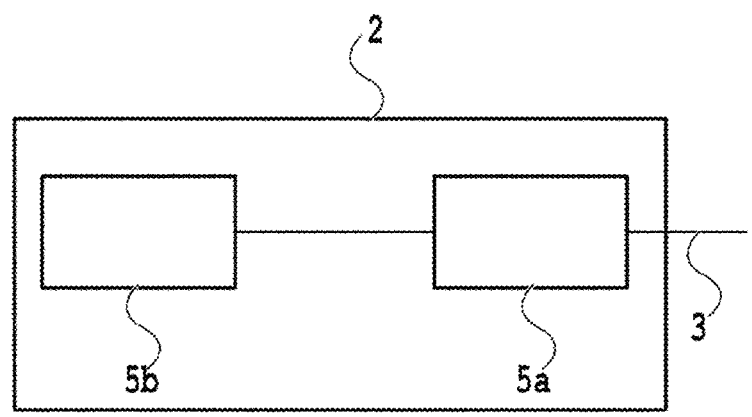
FIG. 2 is a diagram illustrating a configuration of an optical fiber vibration sensor.

A configuration of a system according to Embodiment 1 of the present invention is shown in FIGS. 1 to 2. A manhole position identification system including a vibration sensor 2 that identifies the position of a manhole 1-*n* designated only by an optical fiber length from an intensive optical communication building 4 will be described with reference to FIG. 1. The vibration sensor 2 identifies the position of the manhole 1-*n* designated only by the optical fiber length from the intensive optical communication building 4, based on a result obtained by measuring a longitudinal distribution of vibration with respect to an optical fiber 3 to which the vibration is applied by a mechanism shown below. The mechanism that applies vibration to the optical fiber 3 means that an operator applies an impact blow by hitting the cover of the manhole 1-*n* (where n is an integer of 1 or more) in which the optical fiber 3 is laid. In the present embodiment, the vibration sensor 2 is arranged in the intensive optical communication building 4. The vibration sensor 2 includes an optical meter 5*a* that measures the longitudinal distribution of the vibration, and a signal processing unit 5*b* that identifies the position of the manhole based on the result of the measurement. Note that in the present embodiment, the measuring method is optical time domain reflectometry. Determination using a threshold, filtering processing, and the like that will be described later are executed by a calculator (computer) provided inside the signal processing unit 5*b*. A communication interface is also built in the signal processing unit 5*b*.

It is assumed that a manhole 1-1 is a manhole in which an operation is to be performed and whose position expressed in terms of optical fiber length is known by a water immersion detection module. Here, it is also assumed that, in the vicinity of the manhole 1-1, there are many other manholes 1-2 to 1-*n* (where n is an integer of 2 or more) that are not the operation target. This is a state in which an operator is present near the manhole, but acknowledges the position of the manhole in which an operation is to be performed, only with the fiber length. Conventionally, in this state, the operator would open one manhole after another, but the operator would need to open the manhole while stopping the traffic on the road or taking safety measures, and there is also a high likelihood that the opened manhole is not the manhole in which an operation is to be performed.

According to the present invention, before performing the operation for opening the cover, the operator uses the optical fiber vibration sensor 2 provided in the communication building to measure the optical fiber 3 connected to the manhole to be identified. In parallel with the measurement, the operator applies an impact blow to a manhole, instead of opening the cover thereof. When the impact blow is applied to the manhole, vibration is propagated to the entire housing of the manhole, the propagated vibration vibrates the optical cable inside the manhole, and the vibration of the optical cable is detected by the optical fiber vibration sensor 2, thereby making it possible to associate the position expressed in terms of optical fiber length with the map position of the manhole where the operation is to be performed on site. The association is performed on the manholes 1-1 to 1-*n* sequentially, and the operator identifies the manhole that is present at the same optical fiber length as the optical fiber length known in advance as the position of the manhole in which the operation is to be performed.

Accordingly, the operator can open the cover of the manhole in which the operation is to be performed, without making a mistake, and the operation effectiveness can be improved largely.

If there are two operators, namely, one operator who applies an impact blow and one operator who performs measurement in the communication building, the timings at which an impact blow is applied and at which measurement is performed can be matched with each other only by the operators talking together over the telephone or the like. Even if there is only the operator who applies an impact blow, it will be possible to match the timings, by providing the optical fiber vibration sensor 2 with a communication interface such as an Ethernet (registered trademark) terminal or an IP control function, and by the operator who applies an impact blow performing control via remote communication using a mobile terminal such as a smartphone. If the signal processing unit 5*b* of the optical fiber vibration sensor 2 is provided with a communication interface, and an impact blow when it is applied to the manhole, and measurement performed by the optical fiber vibration sensor 2 are synchronized with each other via the communication interface, one operator who applies an impact blow to the manhole will be able to perform both the application of an impact blow and the measurement at the same time to measure the waveform, and thereby detect vibration caused by the impact blow. There also be a method in which the vibration sensor 2 is brought into a state of continuously performing measurement, and an impact blow is applied during this state.

With respect to the measured waveform, a method may be used in which the operator who performs measurement in the communication building also checks the measured waveform, or a method in which the measurement result is remotely transmitted to the operator who applies an impact blow via the above-described communication means so that the operator can check the result.

However, typically on a manhole, there are large disturbances such as traffic of cars and people, and rain and wind, and even if the operator does not apply an impact blow, the manhole vibrates due to the disturbance, and an optical fiber within the manhole also vibrates. In order to easily extract an impact blow regardless of disturbances, a method for applying large vibration may be used, but if a large device or the like is used to apply large vibration, this requires the same efforts as in a case of opening the cover and identifying the manhole, and does not satisfy the purpose for easily identifying the manhole position. Accordingly, applying an impact blow for identifying a manhole without opening the cover thereof needs to be a simple act without stopping traffic. Therefore, it is necessary to perform identification even using a simple and small impact blow regardless of disturbances.

Figure 3:
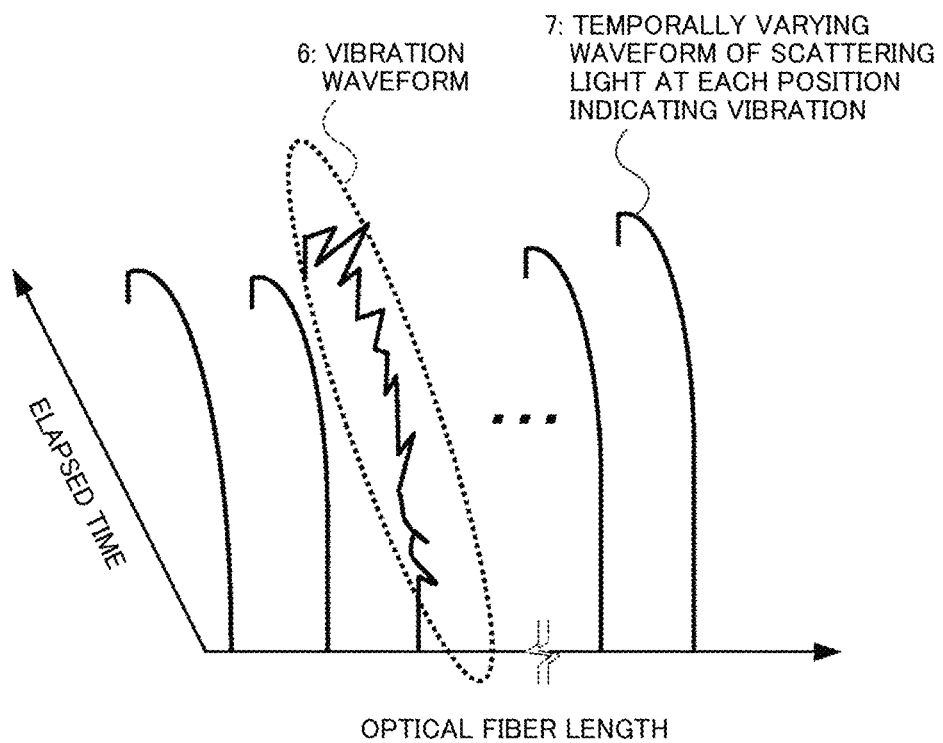
FIG. 3 is a schematic diagram illustrating a group of waveforms measured by the optical fiber vibration sensor.

Also, the waveform caused by an impact blow is detected in a manner such that a temporal variation in scattering light is measured from a predetermined position on the optical fiber. The resolution of the vibration sensor required when it measures a vibration distribution has to be about several meters or lower in order to identify the manhole position. At this time, if the range expressed in terms of fiber length in which an manhole is searched for is about 100 m for example, the operator will need to check several tens of waveforms, and will search for the waveforms while applying impact blows. A schematic diagram of a group of measured waveforms is shown in FIG. 3.

The following will describe a flow for identifying a manhole position in view of these conditions. The manhole position identification method according to the present embodiment includes the following steps (S1) to (S3). In the intensive optical communication building 4, the vibration sensor 2 measures temporally varying waveforms of scattering light from points on the optical fiber 3 when an impact blow is applied to the cover of a manhole located on the path of the optical fiber 3, and thereby vibration positions of the optical fiber 3 are measured in a distribution (S1). Then, in the temporally varying waveforms of the scattering light from the points of the optical fiber 3 in the measurement results obtained by the optical fiber vibration sensor 2, an occurrence of vibration due to the impact blow is determined based on a threshold for the magnitude of a variation in scattering light, and thereby the position of the impact blow is measured (S2). Then, the impact blow position that is located on the measured temporally varying waveform of the scattering light and is expressed in terms of optical fiber length is associated with the map position of the manhole whose cover has received the impact blow, and thereby the position of the manhole designated only by the optical fiber length from the intensive optical communication building is identified (S3). That is to say, the manhole position identification method of the present embodiment includes the following three steps. In the first step, temporal variations in scattering light from the optical fiber 3 when an impact blow is applied to the cover of the manhole 1-n located on the path of the optical fiber 3 are measured from an end of the optical fiber 3, and thereby temporal variations in a scattering light intensity distribution in the longitudinal direction of the optical fiber 3 are obtained. In the second step, an occurrence of vibration due to the impact blow is determined based on the temporal variations at positions in the scattering light intensity distribution, and thereby the impact blow position on the optical fiber 3 is identified. In the third step, the impact blow position on the optical fiber 3 is associated with the map position of the manhole 1-n whose cover has received the impact blow, and thereby the position of the manhole expressed in terms of optical fiber length from an end is identified.

First, a case will be considered in which a range where an operator desires to search has almost no disturbance, such as an area in which there is hardly any traffic. In this case, the waveform caused by vibration appears to be larger than that caused by a disturbance, the impact blow position can easily be associated with the optical fiber length, by determining waveform variations caused by an impact blow vibration based on the threshold, and detecting the position having a variation that exceeds the threshold from among a number of temporal waveforms within the position range of the optical fiber that the operator desires to search. Also, here, the operator can use a suitable method to apply an impact blow. For example, the operator may use a very simple method such as a method of hitting the cover with a hammer of a size such that it can be held by one of his or her hands, or a method of jumping up and down on the cover, wherein moreover the impact blow may have any size, rhythm, and frequency. Since there is basically no disturbance, and vibration can be detected by determination using the threshold, the method for applying an impact blow has no limitation, and thus the position of the vibration can be automatically detected.

Next, a case will be described in which disturbances are so large that by the simple determination method using a threshold, it is difficult to detect vibration generated by a simple method of applying an impact blow, such as hitting a manhole cover with a hammer. In this case, vibration caused by an impact blow is extracted using various vibration parameters. As the method for applying an impact blow, for example, an exciter, which is a vibration speaker, or a speaker (mechanism for generating vibration) is used to control a parameter of vibration to be generated. Specifically, a vibration waveform 6 is subjected to known coding such as a vibration frequency, timing of generating vibration, and intensity modulation such as pulsation of the vibration waveform 6, so that an impact blow is applied. Then, the signal processing unit 5b performs filtering processing for detecting the known coding from a number of waveforms within the range that the operator desires to search. The filtering processing includes, for example, multiplying a temporally varying waveform 7 of the scattering light at each point with the sinusoidal wave of the known frequency, applying a bandpass filter to the range that includes this frequency (a frequency filter is used to extract fixed frequency components), and performing filtering processing that is synchronized with the pulsed waveform or the impact blow timing, and performing comparison between the points. By performing the filtering processing, the optical meter 5a detects, from among various types of noise applied to the manhole, vibration that has occurred by intentionally applying an impact blow. Then, the signal processing unit 5b associates the position that is located on the sensor waveform detected by the optical fiber vibration sensor and is expressed in terms of optical fiber length, with the map position of the manhole to which the actual impact blow was applied, so as to identify the position of the manhole designated only by the optical fiber length from the intensive optical communication building. Typically, a disturbance is vibration in a broadband in which a large number of frequencies are mixed, and thus such vibration of known coding can be extracted by the filtering processing, making it possible to detect the vibration position based on the distance at which this waveform is present. With this processing, it is possible to automatically detect the vibration position.

The following will describe the optical fiber vibration sensor that measures a distribution of vibration positions.

A case where an OTDR-based sensor is used as a sensor method will be described. When OTDR is used to detect vibration, a pulse enters one end of an optical fiber, and thus it is necessary to wait for round-trip time. If the fiber length of an optical fiber communication line is about 10 km, the round-trip time will be 100 µs assuming that the light speed inside the optical fiber is $2\times10^8$ m/s. Because scattering light from each point is measured at 100 µs, there is one temporally varying waveform at every 100 µs, that is, 10 k Sample/s. Accordingly, based on the sampling theorem, vibration measurement using OTDR for an optical fiber of 10 km can cover vibrations of up to 5 kHz. Therefore, the frequency at which the above-described impact blow is applied must be vibration at a low frequency that corresponds to the audibility zone of 5 kHz or lower. Actually, because a low frequency vibration attenuates less and can more easily be propagated, this is advantageous to vibrate the entire housing of the manhole. Based on this fact, the frequency of the above-described exciter or speaker is set. Here, because vibration in the order of kHz corresponds exactly to a dissonant frequency in the audibility zone, if the frequency is set to a lower frequency, namely, a frequency of about 100 Hz or lower, it is possible to generate vibration that does not stick in human ear.

In the present embodiment, a case is assumed in which there is a manhole in which an operation using a water immersion detection module or the like has to be performed. A water immersion detection module curves an optical fiber when an optical closure within a manhole is submerged, and intentionally generates an optical loss, thereby detecting the submergence. Optical cables in optical fiber communication lines include a loop-shaped optical fiber, that is, a so-called maintenance core wire whose two ends are located in a communication building, and the water immersion detection module is arranged on this maintenance core wire. Even when an optical loss occurs in the maintenance core wire due to flood, and it is difficult to perform measurement from one end, OTDR can measure vibration. Accordingly, by performing measurement from the other end located in the same communication building, it is possible to identify the manhole position without causing problem. The vibration caused by an impact blow can be detected by using, as the optical fiber vibration sensor, the OTDR-based sensor that measures back scattering light generated as a result of an optical pulse entering the optical fiber, and measuring, only using light having entered one side of the optical fiber in the intensive optical communication building, vibration having a period longer than the round-trip time in which an optical pulse travels through the measurement target optical fiber. It is also possible to detect vibration having a frequency of an impact blow to be applied to a manhole that is longer than the round-trip time of an optical pulse.

By measuring an impact blow via, of course, not only the maintenance core wire but also a typical communication optical fiber, it is also possible to identify the target manhole based on the optical fiber length from the communication building.

The signal processing unit 5b may also be realized by a computer and a program, and the program may be recorded in a recording medium, or may be provided via a network.

Embodiment 2

In the present embodiment, it is assumed that data is added to the database that manages the facility so that manhole positions can be managed based on fiber lengths from the communication building. Similar to Embodiment 1, also in this case, it is possible to identify the manhole position based on the optical fiber length from the communication building. Here, in contrast to Embodiment 1, both ends of the maintenance core wire can be used without limitation because it causes no optical loss due to submergence or the like. Accordingly, in this case, it is also possible to use an interferometer as a type of sensor. In the present embodiment, the optical meter 5a is an OTDR-based sensor or an optical interferometer. The interferometer emits continuous light, instead of pulses, from both ends of an optical fiber, and thus there is no waiting time such as round-trip time. Therefore, the measured vibration frequency has no fundamental limitation. Also, any vibration frequency when an impact blow is applied may be used. Note however that, as described also in Embodiment 1, a low frequency is desirable in view of an influence on the surroundings or propagation to manholes.

The manhole positions expressed in terms of optical fiber lengths thus measured can be settled also on a map, and thus if the manhole positions are arranged in the order of optical fiber lengths, the path of the optical fiber can be settled on the map. For example, it becomes clear where a branch of the MH path is located on the map, and a complicated underground wiring portions such as a branch and a turning point can be reliably identified. As a result of providing the wiring route database, when a manhole operation is to be performed in the event of abnormality such as flood, no position identification operation is required in every operation, realizing a more efficient operation.

Embodiment 3

Figure 4:
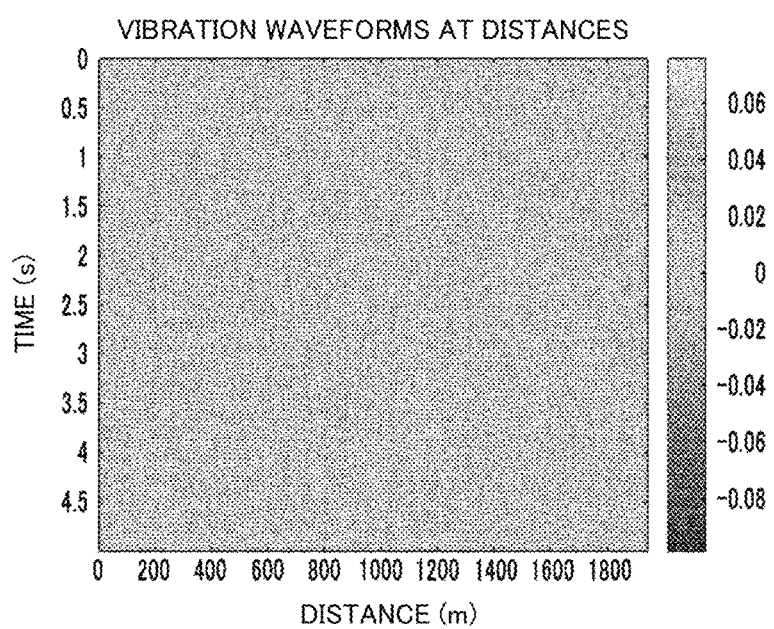
FIG. 4 is a diagram illustrating the problem of a vibration position identification method according to Embodiment 3 of the present invention.

In the vibration position identification technique using optical fiber vibration sensing and vibration actuation, since, as shown in FIG. 4, the signal-to-noise ratio (SNR) of a measurement result is low, there is sometimes a case where it is difficult to identify a vibration position. In FIG. 4, the vertical axis denotes distance (m), and horizontal axis denotes time (s).

In the present embodiment, predetermined vibration having a designated frequency is applied as an impact blow to the cover of a manhole, a spectrum of an envelope curve is calculated with respect to a signal of a temporal variation at each position of the obtained scattering light intensity distribution, and filtering processing is performed to extract a peak of the designated frequency in the spectrum, thereby detecting the vibration caused by the impact blow.

Known vibration is applied to the cover of the manhole to vibrate an optical fiber 403 located below the manhole cover, and the vibration of the optical fiber 403 is detected using an optical fiber vibration sensing device 402 installed inside a communication building, thereby identifying the manhole position in optical metrology.

Figure 5:
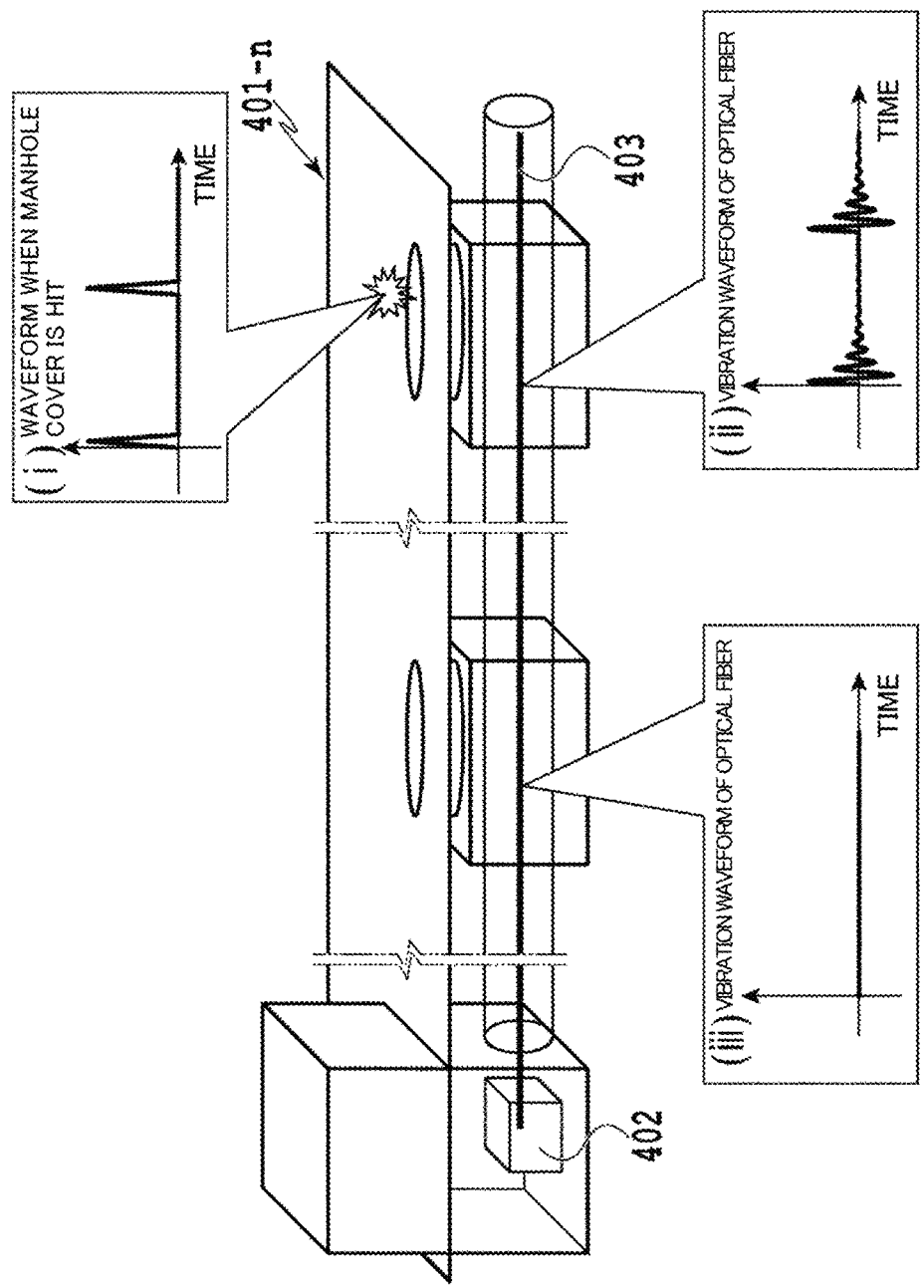
FIG. 5 is a diagram illustrating a vibration position identification system according to Embodiment 3 of the present invention.

FIG. 5 also shows a signal waveform (i) generated when the cover of the manhole 1-$n$ is hit. The vertical axis denotes vibration intensity, and the horizontal axis denote time. FIG. 5 also shows a vibration waveform (ii) of the optical fiber 403 when the cover of the manhole 401-$n$ is hit. The vertical axis denotes vibration intensity, and the horizontal axis denotes time. There are peaks of the vibration when the cover is hit. FIG. 5 also shows a vibration waveform (iii) of the optical fiber 403 when the cover of the manhole 401-$n$ is not hit. The vertical axis denotes vibration intensity, and the horizontal axis denotes time. There is a peak of the vibration when the cover is hit.

Figure 6:
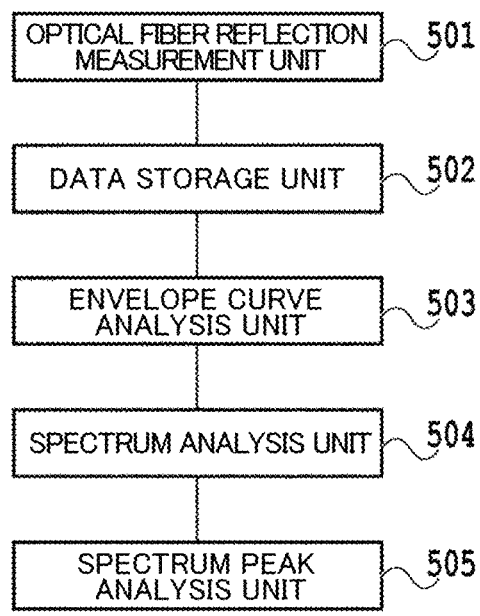
FIG. 6 is a diagram illustrating a configuration of a vibration position identification device according to Embodiment 3 of the present invention.

FIG. 6 is a diagram showing a configuration of the optical fiber vibration sensing device 402, which is a device for identifying a vibration position. The optical fiber vibration sensing device 402 includes: an optical fiber reflection measurement unit 501 that measures vibration of the optical fiber 403; a data storage unit 502 that stores fiber vibration waveforms of temporal variation signals, and data obtained by a spectrum analysis unit 504 and a spectrum peak analysis unit 505; an envelope curve analysis unit 503 that calculates the envelope curve at each position; the spectrum analysis unit 504 that analyses a spectrum of the envelope curve of the vibration waveform at each position on the optical fiber; and the spectrum peak analysis unit 505 that identifies the position of a peak having the frequency at which the manhole is hit as the position at which the manhole is hit.

Figure 7:
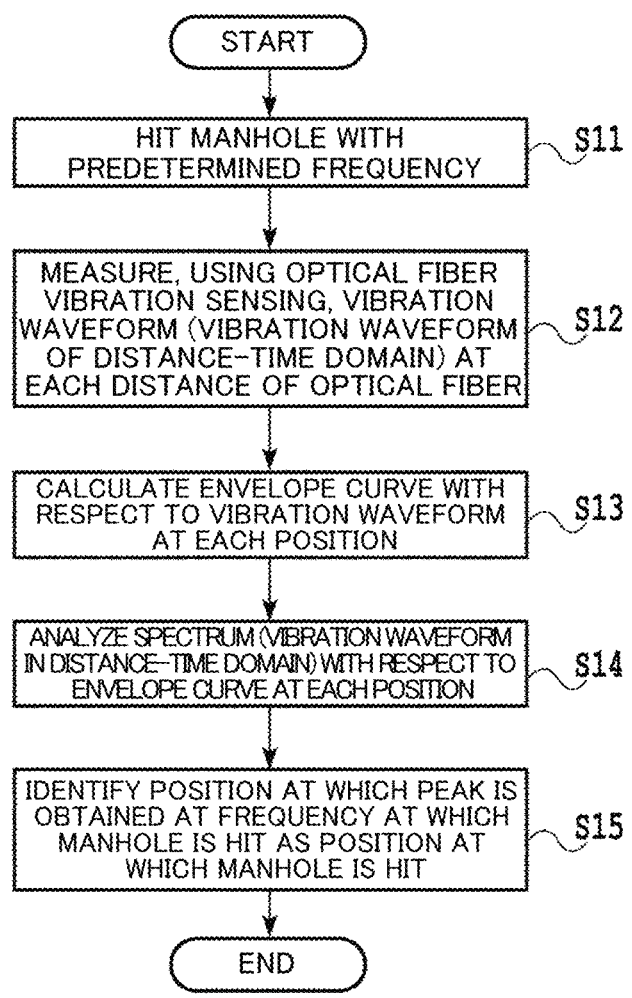
FIG. 7 is a diagram illustrating a flowchart of the vibration position identification method according to Embodiment 3 of the present invention.

In the present embodiment, by performing envelope curve analysis and spectrum analysis on an optical fiber vibration sensing result, the position of the hit manhole is identified. Hereinafter, the processing procedure of the present embodiment will be described with reference to FIG. 7. FIG. 8 show results of the envelope curve analysis and the spectrum analysis.

The cover of the manhole 401-$n$ is hit with a predetermined frequency (step 11). A known signal (comparison signal) is given so as to be detected in signal processing. In the present embodiment, the frequency at which the manhole 401-*n* is hit is set to a known frequency.

In the vibration position identification technique using optical fiber vibration sensing and vibration actuation, since, as shown in FIG. 4, the SNR of a measurement result is low, there is sometimes a case where it is difficult to identify a vibration position. Accordingly, in the vibration position identification technique, the measurement result shown in FIG. 4 is subjected to signal processing, in order to facilitate identification of a vibration position.

Optical fiber vibration sensing is performed to measure vibration waveforms (vibration waveform of a distance-time domain) at distances of the optical fiber (step 12). At the same time as step 11, the vibration waveforms at positions of the optical fiber in the length direction thereof are measured using optical fiber vibration sensing. FIG. 8(*a*) shows the measured vibration waveforms at the distances. Note that FIG. 4 is an enlarged diagram of FIG. 8(*a*).

An envelope curve of the vibration waveform at each position is calculated (step 13). The envelope curve of the vibration waveform at each of the positions of the optical fiber obtained in step 12. FIG. 8(*b*) shows the calculation results of the envelope curves. In FIG. 8(*b*), the vertical axis denotes distance (m), and the horizontal axis denotes time (s). FIG. 8(*c*) shows the vibration waveform when the distance is 1817 m. The envelope curve at the position at which vibration is applied is a pulse string having the repetition frequency that corresponds to the frequency at which the cover of the manhole 401-*n* is hit. On the other hand, the envelope curve at the position at which no vibration is applied is flat.

A spectrum (vibration waveform in a distance-time domain) with respect to the envelope curve at each position is analyzed (step 14). The spectrum of the envelope curve of the vibration waveform at each position of the optical fiber obtained in step 13 is analyzed using the spectrum analysis unit 504 shown in FIG. 6. The spectrum of the position at which the manhole 401-*n* is hit has a peak having the frequency at which the manhole 401-*n* is hit, but the spectrum at the position at which the manhole was not hit does not have a peak.

The position of a peak having the frequency at which the manhole 401-*n* is hit is identified as the position at which the manhole is hit (step 15). In this process, the spectrum peak analysis unit 505 shown in FIG. 6 performs filtering processing to detect the vibration caused by the impact blow.

In the present embodiment, a predetermined vibration having a designated frequency is applied as an impact blow to the cover of a manhole, a spectrum of an envelope curve is calculated with respect to a signal of a temporal variation at each position of an intensity distribution of the obtained scattering light, and filtering processing is performed to extract a peak of the designated frequency in the spectrum, thereby making it possible to detect the vibration caused by the impact blow.

Note that the present invention is not limited to the foregoing embodiments without any change, and constituent components can be modified and implemented in the implementation phase without departing from the spirit thereof. Also, a plurality of constituent components disclosed in the foregoing embodiments can be used in an appropriate combination to realize various types of inventions. For example, some constituent components may be omitted from all of the constituent components disclosed in the embodiments. Furthermore, constituent components of different embodiments may be combined as appropriate.

INDUSTRIAL APPLICABILITY

The present invention is applicable to a technique for identifying the position of a manhole to which an optical fiber communication line is connected, by expressing it in terms of optical fiber length from an intensive communication building.

REFERENCE SIGNS LIST

1-1 to 1-*n*, 401-*n* Manhole
2 Vibration sensor
3, 403 Optical fiber
4 Intensive optical communication building
5*a* Optical meter
5*b* Signal processing unit
6 Vibration waveform
7 temporally varying waveform of scattering light at each point
that indicates vibration
402 Optical fiber vibration sensing device
501 Optical fiber reflection measurement unit
502 Data storage unit
503 Envelope curve analysis unit
504 Spectrum analysis unit
505 Spectrum peak analysis unit

The invention claimed is:

1. A manhole position identification method comprising:
a first step of measuring, from an end of an optical fiber, a temporal variation in scattering light from the optical fiber when an impact blow is applied to a cover of a manhole located on a path of the optical fiber, so as to obtain temporal variations in a scattering light intensity distribution in a longitudinal direction of the optical fiber;
a second step of determining an occurrence of vibration due to the impact blow based on the temporal variations at positions in the scattering light intensity distribution, so as to identify an impact blow position on the optical fiber; and
a third step of associating the impact blow position on the optical fiber with a map position of the manhole whose cover has received the impact blow, so as to identify a position of the manhole expressed in terms of optical fiber length from the end,
wherein in the first step, redetermined vibration due to a designated frequency is applied as the impact blow to the cover, and in the second step, the vibration due to the impact blow is detected by calculating a spectrum of an envelope curve with respect to a temporal variation signal at each of the positions in the scattering light intensity distribution, and performing filtering processing for extracting a peak of the designated frequency on the spectrum.

2. The manhole position identification method according to claim 1, wherein in the first step, applying the impact blow and measuring the temporal variations in the scattering light are synchronized with each other using a communication interface.

3. The manhole position identification method according to claim 1, wherein in the first step, for the measurement of the temporal variations in the scattering light, optical time domain reflectometry is used that measures back scattering light generated by an incident light pulse, and the frequency of the impact blow is set to a frequency having a period that is longer than a time period in which the light pulse makes a round trip through the optical fiber.

4. The manhole position identification method according to claim 1, wherein the first step employs a method in which an optical interferometer is used to measure, from two ends of the optical fiber, a temporal variation in the scattering light.

5. A manhole position identification system to be connected to an end of an optical fiber, and configured to identify the position of a manhole located on a path of the optical fiber, comprising:

an optical meter configured to measure, from the end, temporal variations in scattering light from the optical fiber when an impact blow is applied to a cover of the manhole, so as to obtain temporal variations in a scattering light intensity distribution in a longitudinal direction of the optical fiber;

a vibration mechanism configured to apply predetermined vibration due to a designated frequency as the impact blow to the cover; and a signal processing unit configured to determine an occurrence of vibration due to the impact blow based on the temporal variations at positions in the scattering light intensity distribution, so as to identify an impact blow position on the optical fiber, and to associate the impact blow position on the optical fiber with a map position of the manhole whose cover has received the impact blow, so as to identify a position of the manhole expressed in terms of optical fiber length from the end, wherein the signal processing unit is configured to detect the vibration due to the impact blow by calculating a spectrum of an envelope curve with respect to a temporal variation signal at each of the positions in the scattering light intensity distribution, and performing filtering processing for extracting a peak of the designated frequency on the spectrum.

* * * * *